Nov. 11, 1941.　　　　　　J. H. McKEE　　　　　　2,262,029
METHOD OF MAKING AIRCRAFT PROPELLER BLADES
Filed April 13, 1936　　　3 Sheets-Sheet 1
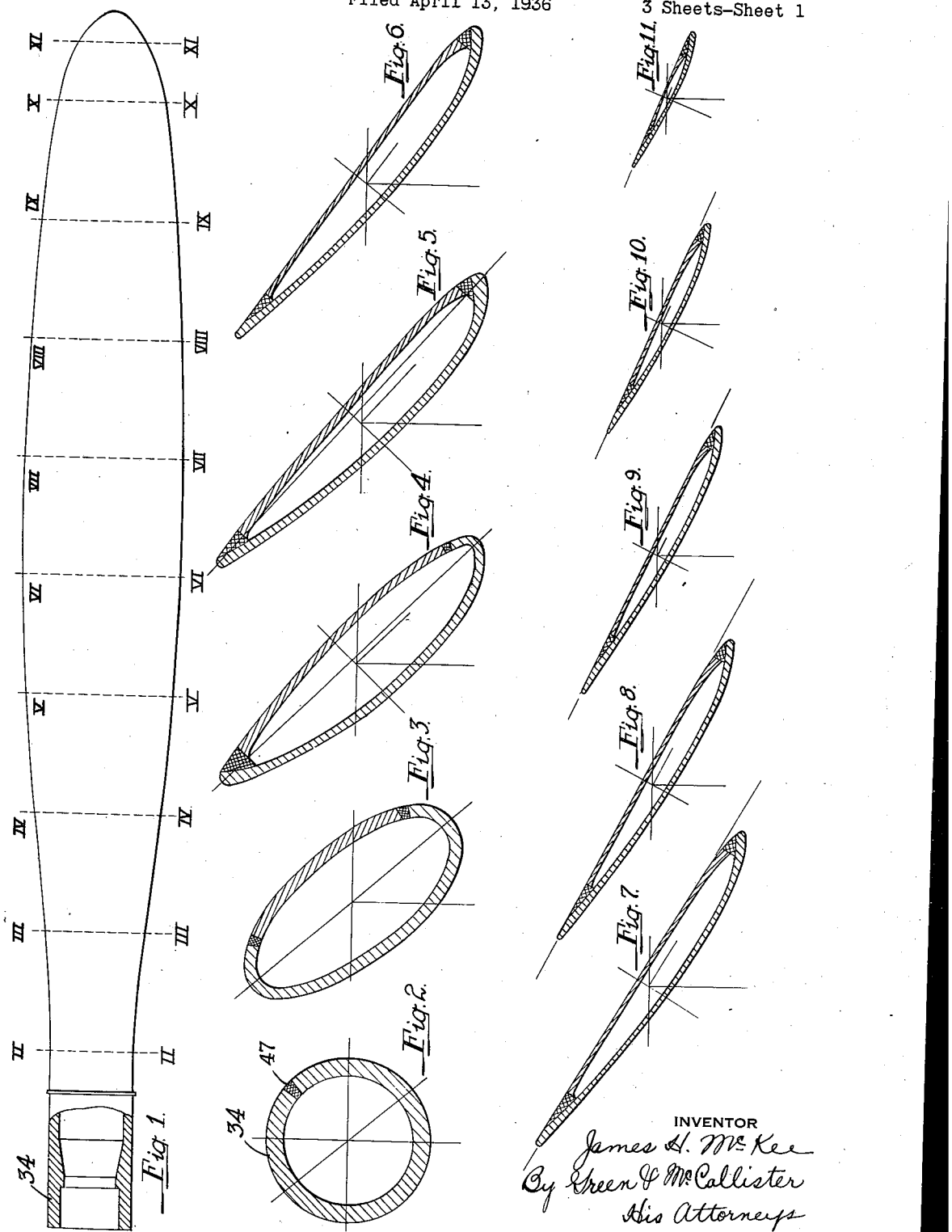
INVENTOR
James H. McKee
By Green & McCallister
His Attorneys

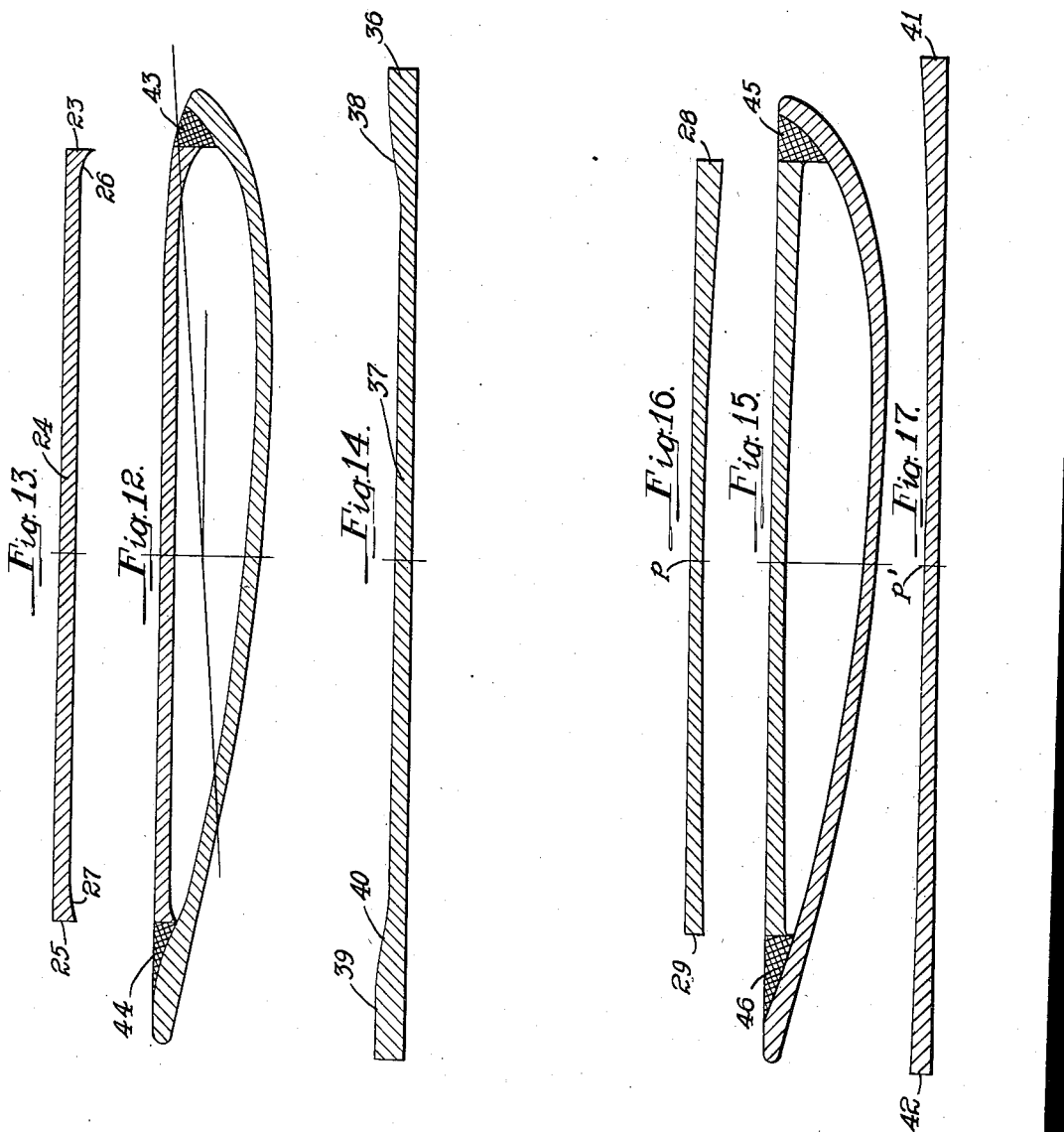

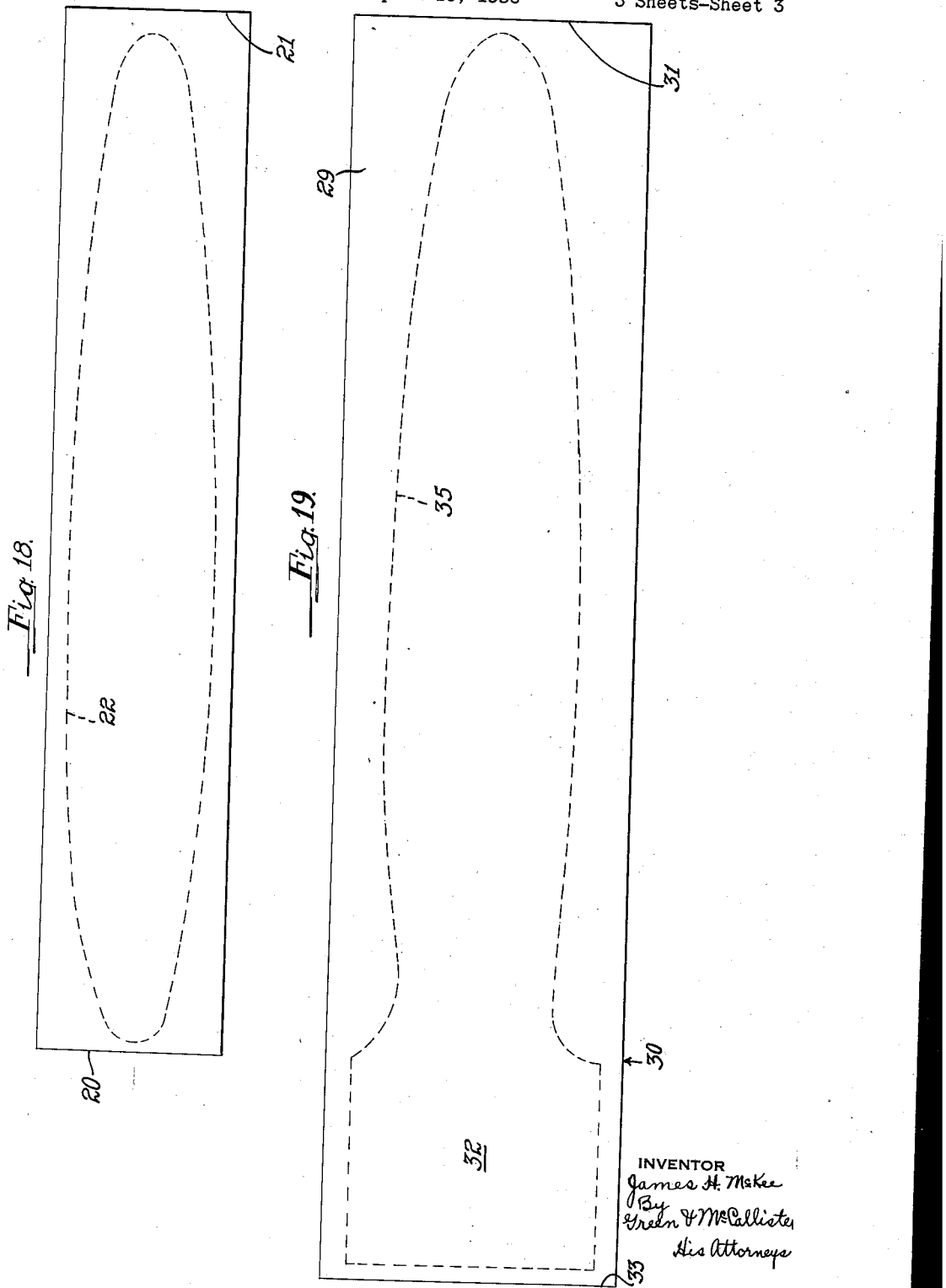

Patented Nov. 11, 1941

2,262,029

UNITED STATES PATENT OFFICE 2,262,029

**METHOD OF MAKING AIRCRAFT PRO-
PELLER BLADES**

James H. McKee, Pittsburgh, Pa., assignor, by mesne assignments, to Curtiss-Wright Corporation, New York, N. Y., a corporation of Delaware Application April 13, 1936, Serial No. 74,007

8 Claims. (Cl. 29—156.8)

This invention relates to hollow metal blades for aircraft propellers and an object of this invention is to materially improve upon blade structures of the type disclosed in T. A. Dicks Patent No. 1,713,500 of May 14, 1929.

Another object of this invention is to provide a new and improved method of manufacturing hollow metal blades for aircraft propellers.

Another object of this invention is to produce a hollow metal aircraft propeller blade formed from relatively thin rolled metal blanks joined together by a fused metal bond and in which the fused metal bond areas increase in proportion to the increase in the blade section areas.

Another object of this invention is to produce a hollow metal aircraft propeller blade formed from relatively thin rolled metal blanks joined together by an inlaid metal weld and in which the weld bond areas increase in proportion to the increase in the blade section areas.

A further object of this invention is to provide a method whereby the unit stress in the high stress areas may be lowered in hollow metal propeller blades of the type disclosed in said patent.

A still further object of this invention is to provide a method adapted to the manufacture of a two-piece hollow aircraft propeller blade in which the parts are bonded together by a fused metal bond which either lies within the pressure face of the blade as in said patent or within the leading and trailing edges of the blade.

These, as well as other objects, I attain by means of the blade structure and the method of manufacturing hollow metal blades for aircraft propellers described in the specification and illustrated in the drawings accompanying the same and forming part of this application and throughout which similar elements are denoted by like characters.

In the drawings—

Figure 1 is a plan view of a finished hollow aircraft propeller blade embodying structural features forming part of my invention and made in accordance with a method of manufacture forming part of my invention.

Figs. 2–11 inclusive are transverse sections of the finished propeller blade of Fig. 1 taken at stations II, III, IV, V, VI, VII, VIII, IX, X, XI.

Fig. 12 is a view similar to Fig. 6 but is enlarged for the purpose of clearer illustration;

Fig. 13 is a transverse section of a trimmed and processed inner camber member blank from which to produce the inner camber member or thrust plate of the blade of the section illustrated in Figs. 2–12 inclusive;

Fig. 14 is a transverse section of a trimmed and processed outer camber member blank from which to produce the outer camber member sometimes referred to as the camber member of the blade of the section illustrated in Figs. 2–12 inclusive;

Fig. 15 is a transverse section of a hollow metal aircraft propeller blade embodying a modification of this invention both as to certain structural features and certain processing steps in their method of manufacture;

Fig. 16 is a transverse section of a trimmed and processed inner camber member blank from which to produce the inner camber member or thrust plate of the modified blade illustrated in Fig. 15;

Fig. 17 is a transverse section of a trimmed and processed outer camber member blank from which to produce the outer camber member sometimes referred to as the camber member of the modified blade of Fig. 15;

Fig. 18 is a top plan view of a blank from which to produce the inner camber members or thrust plates and Fig. 19 is a top plan view of a blank from which to produce outer camber members. Rudimentary camber members are indicated in these views by dotted lines.

A hollow metal blade for aircraft propellers made in accordance with this invention consists of the blade proper and its tubular shank and is made up of an outer hollow camera member, the outer surface of which is sometimes referred to as the suction face of the blade and an inner camber member. The outer surface of the inner camber member is sometimes referred to as the pressure or thrust face of the blade.

I have disclosed herein two forms of hollow metal blade embodying my invention and each is constructed, as in said patent, from two rolled metal blanks joined together into a hollow rigid blade structure by means of a fused metal bond shown herein as an inlaid metal weld. In both forms, the rolled metal blanks are so formed that the leading and trailing edges of the blade are parts of one blank. The blade shank which is tubular, is formed as a unitary part of this same blank.

The improved structural features and manufacturing procedures described and illustrated in this application and which form part of this invention not only add materially to the strength and rigidity of the blade by lowering the unit stresses in the high stress areas but materially facilitate the effective bonding of the camber members into the improved hollow blade structure by increasing the weld bond areas throughout the effective length of the blade and in proportion to the increase of blade section areas.

The blanks from which the camber members are formed, as in said patent, are longitudinally tapered in thickness; the outer camber member blank throughout the major portion of its length from the shank forming portion thereof to its tip end and the inner camber member blank throughout the major portion of its entire length.

In addition to its longitudinal taper, each of the camber member blanks for blades constructed in accordance with this invention is processed, preferably by one or more milling operations, so as to provide for each blank, throughout the major part of its tapered portion, a bounding edge which at any transverse section of the blank is of materially greater thickness than is the body of the blank at its center at such section.

In constructing the form of blade of Figs. 2–12 inclusive, the blank for the outer camber member is provided with a marginal portion of appreciable width. This marginal portion is materially thicker at all transverse sections of the blank than is the blank at the center of such sections. The major or body portion of the blank at all transverse sections is of substantially uniform thickness between such marginal portions and the part of uniform thickness merges into the marginal portions gradually or on an easy slope as disclosed in the drawings.

The blank for the inner camber member for the form of blade of Figs. 2–12 inclusive is provided with a bounding edge which is materially thicker at all transverse sections of the blank than is the blank at the center of such sections. The major or body portion at all transverse sections is of substantially uniform thickness to within a short distance of each of its edges. From a point immediately adjacent each edge the blank increases in thickness gradually or on an easy curve or radius.

In Figs. 13 and 14, I have illustrated in transverse section finished camber member blanks before being subjected to any pressing operation but after trimming. Fig. 13 illustrates the blank for the inner camber member at station VI and Fig. 14 illustrates the blank for the outer camber member at such station. Fig. 13 discloses the thickened edges of the inner camber member and the easy curve or radius which joins the body portion to the thickened edges. Fig. 14 illustrates the marginal portions of appreciable width and which as shown are materially thicker than the major or body portion of the blank.

In the manufacture of the modified form of blade disclosed in connection with Fig. 15 of the drawings, the longitudinally tapered portion of each camber member blank throughout the major portion of its length gradually increases in thickness toward each edge from a longitudinally extending line, which line, in the finished blade parallels and lies adjacent the center of gravity line of the blade. The center of gravity of each transverse section falls on a straight line which coincides with the longitudinal axis of the blade shank.

In Figs. 16 and 17 I have illustrated in transverse section, finished camber member blanks— for the form of blade of Fig. 15—before being subjected to any pressing operation but after trimming. Fig. 16 illustrates the trimmed and processed blank for the inner camber member at a station of the blade corresponding to station VI and Fig. 17 illustrates the trimmed and processed blank for the outer camber member at such station. It will be seen that each of these camber member blanks gradually increases in thickness toward its edges from point $p$ for the inner camber member blank, and $p'$ for the outer camber member blank. This point is located in a longitudinally extending line which in the finished blade parallels and is adjacent the center of gravity line of the blade.

In each form of blade herein illustrated, the outer camber member as shown in the drawings, is hollow. At its hub end the body of this member merges into the tubular shank. The inner camber member, which throughout the major portion of its length is relatively flat, is secured in position within the opening in the open side of the outer camber member by means of an inlaid metal weld. This inlaid metal weld bonds the camber members together into a rigid integral hollow blade structure, and, as illustrated in the drawings, the outer or exposed surface of the metal weld forms a border of appreciable width which entirely surrounds the inner camber member and forms part of the pressure or thrust face of the blade. The weld metal adjacent the leading edge of the blade lies behind the leading edge and that adjacent the trailing edge of the blade lies in front of the trailing edge.

The camber members are made from rolled plate-like material, preferably steel of the desired analysis and preferably sheared into rectangular blanks of proper size. These blanks are relatively thin and each is longitudinally tapered. The thickness of each blank at all transverse sections is that desired for the thicker edge of the camber member at such sections.

The camber member blanks may be given their longitudinal taper by one or more rolling operations or by one or more milling operations.

Fig. 18 represents a rectangular blank which is tapered in thickness from end 20 to end 21. The dotted line 22 indicates, in a general way, the outline of the rudimentary inner camber member to be punched from the blank after the portion bounded by said line has been concaved or provided with the desired surface contour.

Before the rudimentary inner camber member is punched or stamped from the blank, the blank is processed, preferably by one or more milling operations, so that the portion bounded by line 22 is concaved or reduced in thickness in such manner as to provide the desired surface contour having the thickened edges above referred to. If the form of inner camber member disclosed in Figs. 2–12 inclusive is to be produced, then the portion of the blank within line 22 is concaved or processed so that said line defines the outer edge of an area which at all transverse sections is materially thicker at its edges than throughout the major or body portion lying therebetween. That is, at all transverse sections throughout the major portion of the length of this area, the edges at such sections are materially thicker than the major portion of the body of the sections lying between such edges. The edge of such area which is adapted to occupy a position adjacent the leading edge of the blade is preferably thicker than the edge which is adapted to occupy a position adjacent the trailing edge of the blade.

Fig. 13 illustrates a typical transverse section of a blank for the inner camber member of the blade of Figs. 2–12 inclusive, after being concaved to provide the thickened edges and after the rudimentary camber member is punched from the blank. The leading edge 23 of the blank, or that edge adapted to occupy a position in the finished blade adjacent the leading edge of the blade, is materially thicker than the major or body portion 24 of the blank lying between its edges. The trailing edge 25 of the blank is also materially thicker than the major or body portion of the blank. The leading edge 23 as illustrated is approximately 100% thicker at all transverse sections than the body portion 24 and trailing edge 25 is approximately 50% thicker at all transverse sections than said body portion. It will be seen that the body portion merges into the edge portions gradually or on an easy slope or radius 26 adjacent edge 23 and gradually on an easy slope or radius 27 adjacent edge 25.

If the form of inner camber member disclosed in Fig. 15 is to be produced, then the portion of the blank within line 22 is concaved so that said line defines the outer edge of an area which at all transverse sections gradually increases in thickness in opposite directions and on an arc of a circle from a longitudinally extending line which in the finished camber member parallels and is adjacent the center of gravity line of the blade.

Throughout the major portion of the effective length of the blade, the edge which is to occupy a position adjacent the leading edge of the blade is preferably thicker than the edge which is adapted to occupy a position adjacent the trailing edge of the blade.

Fig. 16 illustrates a typical transverse section of a blank for the inner camber member of the blade of Fig. 15 after being milled or otherwise concaved to provide the desired surface contour, and after the rudimentary camber member is punched from the blank. At all transverse sections throughout the major portion of its effective length the leading edge 28 of the blank or that adapted to occupy a position in the finished blade adjacent the leading edge of the blade is approximately 100% thicker than the major or body portion at point $p$ which as above pointed out is located in a longitudinally extending line which in the finished blade parallels and is adjacent the center of gravity line of the blade and the trailing edge 29 at such sections is approximately 50% thicker than the body portion at point $p$. It will be seen that the thickness of the blank gradually increases in opposite directions from point $p$ to edges 28 and 29.

Fig. 19 represents a rectangular blank from which to form an outer hollow camber member. This blank is tapered in thickness from about point 30 to its tip end 31. Portion 32 of the blank or that portion extending from end 33 to point 30 is of uniform thickness and from this portion the tubular shank or root 34 of the blade is formed. Dotted line 35 indicates in a general way the outline of a rudimentary outer camber member to be stamped or punched from the blank after the same has been subjected to such processing (one or more milling or concaving operations) as will remove excess metal from and give the desired surface contour to that portion of the blank bounded by line 35.

If the camber member is to be for the form of blank shown in Figs. 2 to 12 inclusive, this processing provides the rudimentary outer camber member with a relatively thick marginal border as shown in Fig. 14; this being a typical transverse section of a portion of the rudimentary outer camber member blank for this form of blade. The marginal edge portion 36 is of appreciable width and in the finished blade extends along the leading edge from a point between stations IV and V to the tip end of the blade. The marginal portion, as illustrated, gradually merges into the body portion 37 on an easy slope as disclosed at 38. Marginal edge portion 39 which is also of appreciable width and gradually merges into the body portion on an easy slope as shown at 40 extends along the trailing edge from a point between stations III and IV to the tip end of the blade.

If the camber member is to be for the form of blade shown in Fig. 15, this processing or concaving provides a rudimentary outer camber member blank such as disclosed in transverse section in Fig. 17 wherein the leading edge 41 is appreciably thicker than the body of the blank at point $p'$. This point is located in a longitudinally extending line which parallels and is adjacent the center of gravity line of the finished blade. The trailing edge 42 is also appreciably thicker than is the body portion at said point $p'$. The body portion from point $p'$ increases in thickness in opposite directions to edges 41 and 42. As shown in the drawings, leading edge 41 is approximately 100% thicker than the body at point $p'$ and the trailing edge approximately 50% thicker than the body at such point.

I find that a blade of exceptional strength and rigidity can be produced from a pair of camber member blanks processed in accordance with either of the above methods where the leading edges of said blanks at all transverse sections throughout the major portion of the effective length of the blade are approximately 100% thicker than the body portion adjacent the center of gravity line of the blade and approximately 50% thicker at the trailing edges than the body portion adjacent such line.

The percentage of increase in thickness for the leading and trailing edges in the blade of Figs. 2–12 inclusive is uniform throughout the major part of the longitudinally tapered portions of the blanks that have been subjected to the milling operation or operations that give to the blank the desired surface contour, and for the blade of Fig. 15 the increase in thickness in the outer camber member is uniform and in the inner camber member it is uniform throughout the major portion of the effective length of the blade.

The blanks after being trimmed to the desired outline for the rudimentary camber members are pressed by forming dies into the desired form for the finished camber members. Portion 32 which is of uniform thickness is pressed or forged into the tubular shank.

In order to bond the two camber members into a hollow rigid blade structure such as disclosed in the drawings, the outer camber member is supported in a substantially horizontal position with its open side up. The inner camber member is supported in proper relative position within the opening in the open side of the outer camber member by means of a collapsible metal support positioned within the outer camber member and which is so constructed as to be capable of being removed through the hollow shank after the welding operation is completed.

The inner camber member is held in position in contact with this support by means of a metal hold-down device which contacts with the major portion of the upper outer surface of the inner camber member. The two members are then raised to and maintained at a temperature sufficiently high to facilitate the welding operation.

In each of the blades shown in the drawings, the two camber members are bonded together as in said Dicks patent by means of inlaid weld metal which forms a margin of substantial width extending entirely around the inner camber member and which lies between its outer edge and the inner surface of the adjacent edge portion of the outer camber member. The shank forming portion 32 of the outer camber member is converted into the tubular shank and has but a single weld joint 47. This weld joint extends longitudinally of the shank and joins the marginal welds (43 and 44 in the blade of Figs. 2–12 inclusive and 45 and 46 in the blade of Fig. 15) at a point between stations II and III where these marginal welds join.

It will be apparent from an inspection of the drawings that by providing thickened edges for the camber members as disclosed I have materially increased the weld bond areas over those possible in a blade of the same size and weight when constructed of camber members such as disclosed in the Dicks patent wherein said members are formed from tapered blanks which at any transverse section are of uniform thickness from edge to edge.

Welding of the structure is preferably done by the atomic hydrogen method and the use of a welding rod of the same analysis as that of the blanks from which the camber members are formed is preferred. After the welding operation has been completed and the collapsible support has been withdrawn from the interior of the hollow blade structure, the blade is heat treated to remove strains and is subjected to the necessary finishing operations. During these operations the excess weld metal which projects beyond the blade face is removed and the blade shank is finished to fit the hub with which it is to be used.

Having thus described my invention, what I claim as new and desire to secure by Letters Patent is:

1. In the manufacture of a hollow aircraft propeller blade, the steps of longitudinally tapering in thickness two metal blanks, milling each tapered blank so that at all transverse sections thereof throughout the major part of its length it is of materially greater thickness at its bounding edge portions than throughout the major part thereof and having the thinner part merging into the edge portions without an abrupt change, pressing said blanks one into a camber member and the other into a thrust plate and uniting the same into a rigid hollow blade structure by means of an intervening fused metal bond.

2. In the manufacture of a hollow aircraft propeller blade, the steps of longitudinally tapering in thickness two metal blanks, milling each of said tapered blanks so that at all transverse sections thereof throughout the major part of its length it is of greater thickness at its edge portions than throughout its body portion and gradually increases in thickness from the thickness of its body portion to its edge portion, trimming each of said blanks to the form of a rudimentary camber member, pressing said blanks into outer and inner camber members and uniting said members into a rigid hollow blade structure by means of an intervening fused metal bond.

3. In the manufacture of a hollow aircraft propeller blade, the steps of longitudinallly tapering in thickness two metal blanks, milling each of said tapered blanks so that at all transverse sections thereof throughout the major part of its length it is of materially greater thickness at its edge portions than throughout the major part of its width, stamping from said blanks rudimentary camber members, pressing said members into outer and inner camber members, supporting the inner member above the outer member in the position it will occupy in the finished blade and depositing fused metal between the edges of said members whereby they are united into a rigid hollow blade structure.

4. In the manufacture of a hollow aircraft propeller blade, the steps of longitudinally tapering in thickness two metal blanks, concaving one side of each of the tapered blanks throughout a substantial part of its length so that at all transverse sections thereof throughout said part its edges are materially thicker than its center forming said blanks into camber members and uniting the same into a rigid blade stucture by fused bonding metal and finishing the blade.

5. In the manufacture of a hollow aircraft propeller blade, the steps of longitudinally tapering in thickness two metal blanks, concaving one side of each of said tapered blanks throughout a substantial part of its length so that at all transverse sections thereof throughout said concaved part the thickness of the blank increases gradually from the thinnest part to the edges thereof, forming said blanks into inner and outer camber members, uniting the same into a rigid blade structure by fused bonding metal and finishing the blade.

6. In the manufacture of a hollow aircraft propeller blade, the steps of longitudinally tapering in thickness two metal blanks, milling one side of each of the tapered blanks throughout a substantial part of its length so that at all transverse sections thereof throughout such part its edge portions are materially thicker than its body portion, forming said blanks into camber members, uniting said member into a rigid blade structure by fused bonding metal and then finishing the blade.

7. In the manufacture of a hollow aircraft propeller blade, the steps of longitudinally tapering in thickness two metal blanks, removing metal from one side of each of said tapered blanks throughout a substantial part of its length so that at all transverse sections thereof throughout such part the thickness of the blank increases in opposite directions on an arc of a circle from the thinnest part to its edges, forming said blanks into inner and outer camber members, uniting said members into a rigid blade structure by fused bonding metal and then finishing the blade.

8. In the manufacture of a hollow aircraft propeller blade, the steps of longitudinally tapering in thickness two metal blanks, processing said tapered blanks so that at all transverse sections thereof throughout such processed part the thickness of the blank increases in opposite directions on an arc of a circle from its thinnest part to its edges, forming said blanks into inner and outer camber members, uniting said members into a rigid blade structure by fused bonding metal and finishing the blade.

JAMES H. McKEE.